United States Patent [19]
Strong et al.

[11] 3,764,624
[45] Oct. 9, 1973

[54] N-SUBSTITUTED-2,6-DINITRO-3-(ALKOXY OR ALKYLTHIO)-4-SUBSTITUTED-ANILINE COMPOUNDS

[75] Inventors: Philip L. Strong; Don L. Hunter, both of Anaheim; Cecil W. Le Fevre, Tustin, all of Calif.

[73] Assignee: United States Borax & Chemical Corporation, Los Angeles, Calif.

[22] Filed: Aug. 5, 1970

[21] Appl. No.: 61,428

[52] U.S. Cl............ 260/574, 71/88, 71/94, 71/95, 71/98, 71/121, 260/239 A, 260/239 E, 260/247.1, 260/247.7 C, 260/268 PH, 260/293.73, 260/293.83, 260/326.5 M, 260/326.84, 260/571, 260/573, 260/576, 260/577
[51] Int. Cl.................. C07c 87/60, C07c 93/14
[58] Field of Search............. 260/571, 573, 574, 260/576, 577

[56] References Cited
UNITED STATES PATENTS

| | | | |
|---|---|---|---|
| 3,403,180 | 9/1968 | Soper | 260/577 |
| 3,257,190 | 6/1966 | Soper | 260/577 X |
| 3,518,076 | 6/1970 | Wright | 71/121 X |
| 3,546,295 | 12/1970 | Maravetz | 260/577 |
| 3,322,525 | 5/1967 | Martin | 71/98 |
| 3,119,736 | 1/1964 | Clark et al. | 260/577 X |

Primary Examiner—Lewis Gotts
Assistant Examiner—C. F. Warren
Attorney—James R. Thornton

[57] ABSTRACT

N-Substituted 2,6-dinitro-3-alkoxyanilines having a halo, lower alkyl, or trifluoromethyl substituent at the 4-position. The compounds are useful as pre- or post-emergence herbicides and can be formulated with the usual herbicide carriers.

11 Claims, No Drawings

N-SUBSTITUTED-2,6-DINITRO-3-(ALKOXY OR ALKYLTHIO)-4-SUBSTITUTED-ANILINE COMPOUNDS

This invention relates to novel alkoxy substituted dinitroaniline compounds which are particularly useful as herbicides.

According to the present invention, there are provided novel compounds of the formula

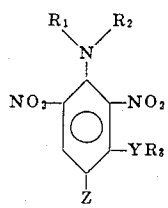

in which $R_1$ represents alkyl of at least two carbon atoms, alkenyl, alkynyl or aryl, $R_2$ represents hydrogen, alkyl, alkenyl, or alkynyl, $R_3$ is lower alkyl of up to six carbon atoms, Y is oxygen or sulfur, and Z represents lower alkyl, halo or trifluoromethyl. Also $R_1$-$R_2$ can represent a portion of a cyclic group such as an alkylene chain to form a heterocyclic group containing carbon atoms in addition to the nitrogen atom which is the point of attachment to the aromatic ring.

Typical examples of organic groups represented by $R_1$ and/or $R_2$ as defined above are the lower alkyl, lower alkenyl, and lower alkynyl groups having up to about eight carbon atoms including the cyclic analogs thereof as well as the halo, hydroxy and lower alkoxy substituted derivatives thereof. Typical examples of aryl groups which can be represented by $R_1$ are the monocyclic aryl groups such as phenyl and the substituted phenyls having one or more halo, lower alkoxy or lower alkyl substituents. Thus, $R_1$ and/or $R_2$ can be:

alkyl
haloalkyl
hydroxyalkyl
lower alkoxyalkyl
alkenyl
haloalkenyl
hydroxyalkenyl
lower alkoxyalkenyl
alkynyl
haloalkynyl
hydroxyalkynyl
lower alkoxyalkynyl
phenyl
halophenyl
lower alkylphenyl
lower alkoxyphenyl in which alkyl, alkenyl and alkynyl have up to eight carbon atoms.

Representative $R_1$ and/or $R_2$ groups are methyl, ethyl, n-propyl, isopropyl, n-butyl, sec-butyl, sec-amyl, n-pentyl, 3-pentyl, n-hexyl, 2-ethylhexyl, allyl, 2-butenyl, 2-butynyl, 3-butynyl, methallyl, 2-pentynyl, 2-hydroxyethyl, 2-bromoethyl, 2-methoxyethyl, 3-ethoxypropyl, 2,2-dimethoxyethyl, 2-chloroallyl, 3-chloropropyl, 4-chloro-2-butynyl, 4-hydroxy-2-butynyl, 1-methyl-2-methoxyethyl, propynyl, 2-bromoallyl, 4-chloro-2-butenyl, 4-bromo-1-butenyl, 3-iodo-2-pentenyl, cyclopropyl, cyclopentyl, cyclohexyl, 2-chlorocyclohexyl, cyclohexenyl, phenyl, 3-chlorophenyl, 3-fluorophenyl, 4-methoxyphenyl, 2,4-dimethoxyphenyl, 4-methoxy-2-butynyl, 2,4-dichlorophenyl, 3-chloro-4-methylphenyl, 2,4-dibromophenyl, 4-ethylphenyl, and the like.

Furthermore $R_1$-$R_2$ can represent a fragment of a ring of which the imino nitrogen is a part thereof such as illustrated by the structure

in which $R_4$ is an alkylene group having from about two to six carbon atoms in the chain and optionally containing other atoms such as oxygen and nitrogen. Such linkages include the dimethylene, trimethylene, tetramethylene, diethyleneoxy, diethyleneimino, and hexamethylene groups.

Examples of lower alkyl groups represented by $R_3$ include methyl, ethyl, n-propyl, isopropyl, n-butyl, amyl and n-hexyl. As pointed out above, Z can also represent lower alkyl of up to about six carbon atoms, trifluoromethyl, or halo such as bromo, chloro, fluoro and iodo.

A preferred class of compounds according to this invention are those in which $R_1$ is alkyl of two to six carbon atoms and $R_2$ is hydrogen or alkyl of one to six carbon atoms, the total number of carbon atoms for $R_1 + R_2$ being about four to eight, $R_3$ is alkyl of one to about three carbon atoms, Y represents oxygen, and Z is trifluoromethyl.

The dinitroanilines of this invention are readily prepared by reaction of the corresponding 3-halo-2,6-dinitroaniline with an alkali metal alkoxide or thioalkoxide according to the following equation

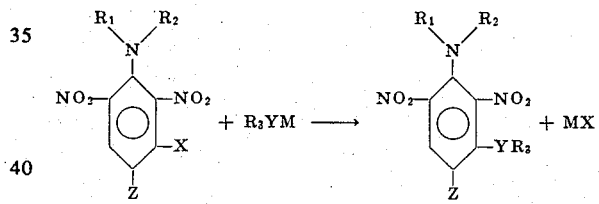

in which $R_1$, $R_2$, $R_3$, Y and Z have the significance previously assigned, X represents a reactive halogen atom such as bromine or chlorine and M represents an alkali metal such as sodium or potassium.

The reaction takes place by combining approximately equimolar amounts of the reactants at a temperature of from about room temperature to about 100° C. Preferably a solvent such as an alcohol is employed in order to control reaction temperatures and facilitate handling of the reactants. The insoluble by-product metal halide is readily separated from the reaction mixture such as by filtration and the desired product isolated and purified by conventional procedures. The desired compounds are either high-boiling liquids or crystalline solids which can be recrystallized from a suitable solvent, such as an alcohol.

The alkali metal alkoxide or thioalkoxide is prepared by well-known procedures such as by addition of metallic sodium or potassium to the selected alcohol or thiol. The intermediate 4-substituted 3-halo-2,6-dinitroaniline can be prepared by reaction of at least an equimolar amount of an organic amine with the corresponding 4-substituted 1,3-dihalo-2,6-dinitrobenzene in the presence of a solvent such as a hydrocarbon or alcohol. Preferably, about 2 moles of the amine is used for each mole of the dihalodinitrobenzene, the second mole of amine neutralizing the by-product hydrogen halide as it is formed. Alternatively, a tertiary amine can be used as the acid neutralizing agent. The reaction can be carried out in a sealed reaction vessel such as an autoclave or at atmospheric pressure in the presence of a solvent. A reaction temperature in the range of from about 20° to about 100° C. preferably is employed to give good yields of the desired product and a satisfactory rate of reaction. The by-product amine hydrohalide is removed by washing with water or by filtration from the solvent in which it is insoluble. The desired product is isolated and purified by well-known procedures such as by recrystallization.

The 4-substituted 1,3-dihalo-2,6-dinitrobenzene starting materials are readily prepared by nitration of the corresponding 1,3-dihalobenzene with a mixture of fuming nitric and fuming sulfuric acids at a temperature below about 80° C.

An alternate method for preparing the alkoxydinitroanilines of this invention comprises the amination of the corresponding 6-substituted 1,3-dialkoxy-2,4-dinitrobenzene. About equimolar amounts of the selected organic amine are reacted with the dialkoxybenzene in a sealed reaction vessel at an elevated temperature. The alkoxy substituent between the nitro groups is preferentially displaced by the amine to give the desired mono alkoxyaniline.

The following examples illustrate the preparation of representative compounds of the present invention.

EXAMPLE I

N-isopropyl-2,6-dinitro-3-methoxy-4-trifluoromethylaniline

A 200 ml. round-bottomed flask equipped with a magnetic stirrer and reflux condenser was charged with 5.0 g. (0.0152 mole) of N-isopropyl-3-chloro-2,6-dinitro-4-trifluoromethylaniline and 50 ml. of anhydrous methanol. To this stirred solution was added 3.77 g. (0.0152 mole) of a 21.8% methanolic sodium methoxide solution. On addition, the mixture became a very deep red color. The mixture was stirred at room temperature for 6 hours and was then heated at reflux temperature for 18 hours. During this time the solution became a light orange color and a small amount of white solids had precipitated. The methanol was stripped from the reaction mixture on a rotary evaporator leaving an orange semi-solid residue. To this residue was added 100 ml. of hexane and the mixture was refluxed with stirring for one hour to dissolve product away from sodium chloride and any other hexane-insoluble materials. The mixture was cooled somewhat and filtered. The insoluble solids were washed with hexane and the filtrates were evaporated to an orange oil which slowly crystallized on standing at room temperature. This residue was dissolved in 25 ml. of refluxing 95% ethanol, and on standing, the product crystallized to give 3.46 g. (70.5%) of a yellow crystalline solid; m.p. 55.5°–57° C. After recrystallization from 95% ethanol, the product melts at 54.5°–55.5° C.

EXAMPLE II

N,N-di-n-propyl-2,6-dinitro-3-methoxy-4-trifluoromethylaniline

The compound was prepared in a similar manner by reaction of N,N-di-n-propyl-3-chloro-2,6-dinitro-4-trifluoromethylaniline with sodium methoxide in anhydrous methanol. The product was obtained in 80.5% yield as a slightly viscous, red oil.

EXAMPLE III

N,N-diethyl-2,6-dinitro-3-methylthio-4-trifluoromethylaniline

A solution of sodium methylmercaptide was prepared by adding 0.25 g. (0.011 mole) of sodium to 5.30 g. (0.011 mole) of 10% methyl mercaptan in ethanol and stirring until the sodium had all reacted. The resultant solution was then added dropwise to 3.42 g. (0.01 mole) of N,N-diethyl-3-chloro-2,6-dinitro-4-trifluoromethylaniline in 25 ml. of dry ethanol. The resultant mixture was stirred at room temperature for 20 hours. The solvent was removed by distillation under reduced pressure and the residue was then dissolved in 100 ml. of ether and filtered. Evaporation of the ether gave a solid residue which was recrystallized from absolute ethanol to give 2.17 g. (62%) of the desired product as an orange solid, m.p. 67.5°–69° C.

EXAMPLE IV

N,N-di-n-propyl-2,6-dinitro-3-hexyloxy-4-trifluoromethylaniline

A solution of n-hexyl alcohol sodium salt was prepared by heating 0.23 g. (0.01 mole) of sodium in 25 ml. of n-hexanol at reflux temperature for 15 hours. This solution was added to a solution of 3.70 g. (0.01 mole) N,N-di-n-propyl-3-chloro-2,6-dinitro-4-trifluoromethylaniline in 20 ml. of hexanol. The resultant mixture was stirred at room temperature for 6 hours and then at reflux temperature overnight. The solvent was removed by use of a rotary vacuum evaporator under reduced pressure. The residue was extracted with boiling hexane. The hexane extract was evaporated to give a residue which was dissolved in absolute ethanol, filtered and again stripped of solvent under reduced pressure to give 3.69 g. (85%) of amber-colored oil. The product was identified by its infrared and NMR spectra.

The following are among the many other compounds of this invention which can be prepared according to the procedures described above.

N-cyclohexyl-4-chloro-2,6-dinitro-3-methoxyaniline; m.p. 92°–93° C.

N,N-pentamethylene-4-chloro-2,6-dinitro-3-methoxyaniline; m.p. 94°–95.5° C.

N-ethyl-2,6-dinitro-3-methoxy-4-trifluoromethylaniline; m.p. 98°–98.5° C.

N-sec-butyl-2,6-dinitro-3-methoxy-4-trifluoromethylaniline; oil

N-tert.butyl-2,6-dinitro-3-methoxy-4-trifluoromethylaniline; oil

N,N-diethyl-2,6-dinitro-3-methoxy-4-trifluoromethylaniline; oil

N-methyl-N-n-butyl-2,6-dinitro-3-methoxy-4-trifluoromethylaniline; oil

N-methyl-N-sec-butyl-2,6-dinitro-3-methoxy-4-trifluoromethylaniline; oil

N-ethyl-N-n-propyl-2,6-dinitro-3-methoxy-4-trifluoromethylaniline; oil

N-ethyl-N-isopropyl-2,6-dinitro-3-methoxy-4-trifluoromethylaniline; oil

N-ethyl-2,6-dinitro-3-ethoxy-4-trifluoromethylaniline; m.p. 104.5°–106° C.

N,N-diethyl-2,6-dinitro-3-ethoxy-4-trifluoromethylaniline; oil

N-sec-butyl-2,6-dinitro-3-ethoxy-4-trifluoromethylaniline; oil

N-(3-amyl)-2,6-dinitro-3-ethoxy-4-trifluoromethylaniline; oil
N-sec-amyl-2,6-dinitro-3-ethoxy-4-trifluoromethylaniline; oil
N,N-diethyl-2,6-dinitro-3-isopropoxy-4-trifluoromethylaniline; oil
N,N,-diethyl-2,6-dinitro-3-n-butoxy-4-trifluoromethylaniline; oil
N-sec-butyl-2,6-dinitro-3-methylthio-4-trifluoromethylaniline; oil
N,N-di-n-propyl-2,6-dinitro-3-methylthio-4-trifluoromethylaniline; m.p. 84°–86° C.
N-ethyl-2,6-dinitro-3-butylthio-4-trifluoromethylaniline; m.p. 46°–48° C.
N-sec-amyl-2,6-dinitro-3-n-hexylthio-4-trifluoromethylaniline; oil
N,N-di-n-propyl-2,6-dinitro-3-ethoxy-4-trifluoromethylaniline; oil
N,N-pentamethylene-2,6-dinitro-3-methoxy-4-trifluoromethylaniline; m.p. 98°–99° C.
N-(1-methyl-2-methoxyethyl)-2,6-dinitro-3-methoxy-4-trifluoromethylaniline; m.p. 57.5°–58.5° C.
N-(2,2-dimethoxyethyl)-2,6-dinitro-3-methoxy-4-trifluoromethylaniline; m.p. 63°–64° C.
N-n-hexyl-2,6-dinitro-3-methoxy-4-trifluoromethylaniline; oil
N-ethyl-N-n-butyl-2,6-dinitro-3-methoxy-4-trifluoromethylaniline; oil
N,N-diallyl-2,6-dinitro-3-methoxy-4-trifluoromethylaniline; oil
N-phenyl-2,6-dinitro-3-methoxy-4-trifluoromethylaniline; m.p. 100°–102° C.
N-cyclohexyl-2,6-dinitro-3-methoxy-4-trifluoromethylaniline; m.p. 94.5°–95° C.
N-cyclopropyl-2,6-dinitro-3-methoxy-4-trifluoromethylaniline; m.p. 62.5°–63.5° C.
N,N-diethyleneoxy-2,6-dinitro-3-methoxy-4-trifluoromethylaniline; m.p. 114°–115° C.
N-(3-chloro-n-propyl)-2,6-dinitro-3-methoxy-4-trifluoromethylaniline; oil
N,N-di-n-butyl-2,6-dinitro-3-methoxy-4-trifluoromethylaniline; oil
N,N-bis-(2-methoxyethyl)-2,6-dinitro-3-methoxy-4-trifluoromethylaniline; oil
N-sec-amyl-2,6-dinitro-3-methoxy-4-trifluoromethylaniline; oil
N-(3-pentyl)-2,6-dinitro-3-methoxy-4-trifluoromethylaniline; oil
N-methyl-N-cyclopentyl-2,6-dinitro-3-methoxy-4-trifluoromethylaniline; oil
N-sec-butyl-4-bromo-2,6-dinitro-3-methoxyaniline; oil
N,N-diethyl-4-bromo-2,6-dinitro-3-methoxyaniline; oil
N-sec-amyl-4-bromo-2,6-dinitro-3-methoxyaniline; oil
N-methyl-N-sec-butyl-4-bromo-2,6-dinitro-3-methoxyaniline; oil
N,N-di-n-propyl-4-bromo-2,6-dinitro-3-methoxyaniline; oil
N-(3-chloro-n-propyl)-4-chloro-2,6-dinitro-3-methoxyaniline; oil
N-(1-methyl-2-methoxyethyl)-4-chloro-2,6-dinitro-3-methoxyaniline; oil
N,N-di-n-butyl-4-chloro-2,6-dinitro-3-methoxyaniline; oil
N-sec-butyl-2,6-dinitro-3-methoxy-4-methylaniline; oil
N,N-diethyl-2,6-dinitro-3-methoxy-4methylaniline; oil
N,N-di-n-propyl-2,6-dinitro-3-methoxy-4-methylaniline; oil

EXAMPLE V

N-propargyl-2,6-dinitro-3-methoxy-4-trifluoromethylaniline

A 25 ml. heavy-walled glass reaction tube was charged with 4.0 g. (0.0135 mole) of 2,4-dimethoxy-3,5-dinitrobenzotrifluoride, 0.74 g. (0.0135 mole) of propargylamine and about 20 ml. of dimethoxyethane. The tube was sealed and allowed to stand at room temperature for 98 hours followed by heating in an oven at 105° C. for 4 hours. The tube was then opened and the contents transferred to a 250 ml. round-bottomed flask. The solvent was removed on a Rinco evaporator leaving a residual oil which crystallized on standing. The residue was dissolved in 25 ml. of refluxing 95% ethanol and, on cooling, the product crystallized. The solids were filtered and vacuum dried giving 1.77 g. (41.1%) of a yellow crystalline product; m.p. 81°–82.5° C. After recrystallization from ethanol, the product melts at 82.5°–84° C.

EXAMPLE VI

In a similar manner, 2,4-dimethoxy-3,5-dinitrobenzotrifluoride was reacted with 2-hydroxyethylamine to give N-(2-hydroxyethyl)-2,6-dinitro-3-methoxy-4-trifluoromethylaniline; m.p. 100.5°–101.5° C.

EXAMPLE VII

In a similar manner, 2,4-dimethoxy-3,5-dinitrobenzotrifluoride was reacted with diethanolamine to give N,N-bis(2-hydroxyethyl)-2,6-dinitro-3-methoxy-4-trifluoromethylaniline; m.p. 145°–146° C.

The compounds of this invention are excellent herbicides and are especially useful as selective herbicides for controlling weeds in the presence of desirable crops, such as cotton and beans such as soybeans.

The compounds can be applied as both a pre-emergence or a post-emergence treatment; that is they can be applied to soil in which the weeds will grow or they can be used to kill or suppress the growth of weeds or to kill or prevent the emergence of seedlings of undesirable plants. Thus, the alkoxyanilines can be used to control the growth of weeds by applying a phytotoxic amount of one or more of the active compounds of this invention to the locus to be protected, that is, soil in which the weeds are growing or will grow or the foliage of the growing plants. "Weeds" as used herein is meant to include any plant growth which is undesirable.

Generally an application rate of from about 0.1 to about 30 pounds of one or more of the active compounds per acre is effective in controlling plant growth. Preferably an application rate of from about 0.25 to about 6 pounds per acre is employed. At such rates the undesirable weeds are killed or stunted with little or no injury to desirable crops.

The following examples illustrate the herbicidal activity of typical compounds of this invntion.

EXAMPLE VIII

The compounds to be tested were evaluated as both a pre-emergence and post-emergence treatment.

Greenhouse flats were planted to soybeans (SB), velvet leaf (VL), oats (O) and millet (M) and the flats sprayed on the same day as planting with an ethanol-dioxane solution of the compound to be tested at a rate of 5 pounds per acre.

Another set of flats with the same plats was treated after the plants had emerged and were about 1 inch in height. These flats were also sprayed with an ethanol-dioxane solution of the compound to be tested at a rate of 5 pounds per acre. The flats were kept in the greenhouse and watered when needed. 21 days after treatment the flats were examined and the plants rated for herbicidal activity on a 0 to 9 scale in which 0 = no effect, 5 = substantial injury with some kill, and 9 = complete kill. The following results were obtained.

TABLE I

| Compound | Activity | | | | | | | |
|---|---|---|---|---|---|---|---|---|
| | Pre | | | | Post | | | |
| | SB | VL | O | M | SB | VL | O | M |
| N,N-pentamethylene-2,6-dinitro-3-methoxy-4-trifluoromethylaniline | 0 | 1 | 0 | 5 | 3 | 2 | 1 | 3 |
| N,N-diethyl-2,6-dinitro-3-methylthio-4-trifluoromethylaniline | 3 | 3 | 6 | 9 | 4 | 2 | 5 | 4 |
| N-isopropyl-2,6-dinitro-3-methoxy-4-trifluoromethylaniline | 0 | 3 | 1 | 9 | 3 | 3 | 0 | 2 |
| N,N-di-n-propyl-2,6-dinitro-3-methylthio-4-trifluoromethylaniline | 3 | 4 | 6 | 9 | 4 | 4 | 5 | 6 |
| N,N-di-n-propyl-2,6-dinitro-3-ethoxy-4-trifluoromethylaniline | 0 | 3 | 5 | 9 | 2 | 4 | 5 | 4 |
| N-(1-methyl-2-methoxyethyl)-2,6-dinitro-3-methoxy-4-trifluoroaniline | 0 | 7 | 3 | 9 | 3 | 3 | 2 | 5 |
| N-methyl-N-cyclopentyl-2,6-dinitro-3-methoxy-4-trifluoromethylaniline | 1 | 2 | 2 | 9 | 4 | 3 | 0 | 2 |
| N-ethyl-N-n-propyl-2,6-dinitro-3-methoxy-4-trifluoromethylaniline | 3 | 3 | 6 | 9 | 3 | 3 | 5 | 6 |
| N-methyl-N-n-butyl-2,6-dinitro-3-methoxy-4-trifluoromethylaniline | 0 | 2 | 1 | 7 | 3 | 3 | 2 | 3 |
| N,N-diallyl-2,6-dinitro-3-methoxy-4-trifluoromethylaniline | 1 | 3 | 1 | 9 | 3 | 3 | 0 | 5 |
| N-(3-pentyl)-2,6-dinitro-3-methoxy-4-trifluoromethylaniline | 4 | 7 | 7 | 9 | 4 | 4 | 3 | 9 |
| N-sec-amyl-2,6-dinitro-3-methoxy-4-trifluoromethylaniline | 3 | 8 | 3 | 9 | 4 | 3 | 3 | 9 |
| N,N-bis(2-methoxyethyl)-2,6-dinitro-3-methoxy-4-trifluoromethylaniline | 1 | 5 | 2 | 9 | 2 | 3 | 1 | 3 |
| N-sec-butyl-2,6-dinitro-3-methylthio-4-trifluoromethylaniline | 2 | 7 | 6 | 9 | | | | |
| N-(1-methyl-2-methoxyethyl)-4-chloro-2,6-dinitro-3-methoxyaniline | 7 | 5 | 3 | 9 | | | | |
| N,N-diethyl-4-bromo-2,6-dinitro-3-methoxyaniline | 0 | 7 | 2 | 9 | | | | |
| N,N-di-n-propyl-2,6-dinitro-3-methoxy-4-methylaniline | 0 | 7 | 2 | 9 | | | | |
| N-sec-butyl-2,6-dinitro-3-methoxy-4-methylaniline | 3 | 8 | 5 | 9 | | | | |
| N-sec-butyl-4-bromo-2,6-dinitro-3-methoxyaniline | 6 | 8 | 3 | 9 | | | | |
| N-sec-butyl-2,6-dinitro-3-ethoxy-4-trifluoromethylaniline | 0 | 4 | 7 | 9 | | | | |
| N-(3-chloro-n-propyl)-2,6-dinitro-3-methoxy-4-chloroaniline* | 1 | 0 | 3 | 3 | 2 | 2 | 3 | 8 |

*Applied at 25 pounds per acre.

NOTE: Some of the compounds were not included in the post-emergence test.

EXAMPLE IX

Greenhouse flats were sprayed with three of the compounds of this invention at a rate of 0.25 pound per acre and the compound was then incorporated by mixing with the soil in the flat. On the same day as treatment soybeans, cotton, foxtail, wildoats, millet, watergrass, crabgrass, pigweed, velvet leaf and morning glory were planted in the treated soil. The flats were kept in the greenhouse and watered when needed. Twenty-two days after treatment the flats were examined and the plants rated for herbicidal activity as described in Example VIII. The following results were obtained.

TABLE II

| Compound | Activity | | |
|---|---|---|---|
| | A | B | C |
| Plant specie: | | | |
| Soybeans | 0 | 0 | 0 |
| Cotton | 0 | 0 | 0 |
| Foxtail | 7 | 6 | 9 |
| Wild oats | 3 | 0 | 3 |
| Millet | 7 | 7 | 8 |
| Watergrass | 5 | 7 | 9 |
| Crabgrass | 8 | 7 | 9 |
| Pigweed | 8 | 8 | 9 |
| Velvet leaf | 3 | 3 | 3 |
| Morning glory | 5 | 2 | 2 |

Compound A = N-sec-butyl-2,6-dinitro-3-methoxy-4-trifluoromethylaniline.
Compound B = N,N-diethyl-2,6-dinitro-3-methoxy-4-trifluoromethylaniline.
Compound C = N,N-di-n-propyl-2,6-dinitro-3-methoxy-4-trifluoromethylaniline.

EXAMPLE X

The procedure of Example VIII was followed except the compounds to be tested were applied as a pre-emergence treatment at a rate of 15 pounds per acre. The following results were obtained.

TABLE III

| Compound | Activity | | | |
|---|---|---|---|---|
| | SB | VL | O | M |
| N,N-diethyl-2,6-dinitro-3-ethoxy-4-trifluoromethylaniline | 3 | 3 | 7 | 9 |
| N,N-diethyl-2,6-dinitro-3-isopropoxy-4-trifluoromethylaniline | 0 | 3 | 3 | 3 |
| N,N-di-n-propyl-2,6-dinitro-3-n-hexyloxy-4-trifluoromethylaniline | 0 | 6 | 1 | 0 |
| N,N-diethyl-2,6-dinitro-3-methoxy-4-methylaniline | 1 | 8 | 3 | 9 |
| N-methyl-N-sec-butyl-4-bromo-2,6-dinitro-3-methoxyaniline | 2 | 6 | 4 | 9 |

Since a relatively small amount of one or more of the active anilines should be uniformly distributed over the area to be treated, the compounds preferably are formulated with conventional herbicide carriers, either liquid or solid. Thus, the compounds can be impregnated on or admixed with a pulverulent solid carrier such as lime, talc, clay, Bentonite, calcium chloride, vermiculite, and the like. Alternatively, the compounds can be dissolved or suspended in a liquid carrier such as water, kerosene, alcohols, diesel oil, xylene, benzene, glycols, ketones, and the like. Since many of the compounds are oils, they are readily formulated in solvents. A surfactant preferably is included to aid in dispersion, emulsification and coverage. The surfactant can be ionic or nonionic, and may be a liquid or a solid. The use of the term "surfactant" herein is intended to include such compounds commonly referred to as wetting agents, dispersing agents and emulsifying agents. Typical surfactants include the alkylarylsulfonates, the fatty alcohol sulfates, sodium salt of napthalenesulfonic acid, alkylaryl polyether alcohols, long chain quaternary ammonium compounds, sodium salts of petroleum-derived alkylsulfonic acids, polyoxyethylenesorbitan monolaurate, and the like. These dispersing and wetting agents are sold under numerous trademarks and may either be pure compounds, mixtures of compounds of the same general group, or they can be mixtures of compounds of different classes. Surfactants can also be included in compositions containing a solid inert carrier.

Concentrated compositions containing the active agent which can be subsequently diluted, as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5 percent to about 99 percent by weight of one or more of the active anilines with a carrier or diluent, which may be a liquid or a solid. Liquid carriers which are miscible with the active agent or other liquids in which the compound may be suspended or dispersed can be used. A surfactant is also generally included to facilitate such dilution or dispersion in water. However, the surfactant itself may comprise the carrier in such concentrates.

The herbicidal compositions can include other beneficial adjuvants, such as humectants, oils and contact agents. Also, other herbicides such as the sodium borates, sodium chlorate, chlorophenoxyacetic acids, substituted uracils and ureas, triazines, benzimidazoles, carbamates, anilides, amides, and halo-alkanoic acids, can be included in the formulation.

Various changes and modifications of the invention can be made, and, to the extent that such variations incorporate the spirit of this invention, they are intended to be included within the scope of the appended claims.

What is claimed is:

1. A compound of the formula

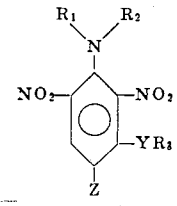

in which $R_1$ is lower alkyl of at least two carbon atoms, lower cycloalkyl, lower alkenyl, lower cycloalkenyl, lower alkynyl, or monocyclic aryl and $R_2$ is hydrogen, lower alkyl, lower cycloalkyl, lower alkenyl, lower cycloalkenyl, or lower alkynyl, said lower alkyl, lower cycloalkyl, lower alkenyl, lower cycloalkenyl and lower alkynyl groups having 0–2 halo, hydroxy or lower alkoxy substituents, said monocyclic aryl having 0–2 halo, lower alkoxy or lower alkyl substituents, $R_3$ is lower alkyl, Y is oxygen or sulfur, and Z is lower alkyl, halo, or trifluoromethyl.

2. A compound in accordance with claim 1 in which $R_1$ is alkyl of two to six carbon atoms, $R_2$ is hydrogen or alkyl of one to six carbon atoms, $R_3$ is alkyl of one to three carbon atoms and Y is oxygen, the total number of carbon atoms represented by $R_1 + R_2$ being four to eight.

3. A compound in accordance with claim 2 in which Z is trifluoromethyl.

4. A compound in accordance with claim 2 in which Z is chloro.

5. A compound in accordance with claim 2 in which Z is methyl.

6. A compound according to claim 2 in which $R_1$ and $R_2$ are ethyl.

7. A compound according to claim 2 in which $R_1$ and $R_2$ are n-propyl.

8. A compound according to claim 2 in which $R_1$ is hydrogen and $R_2$ is 3-pentyl.

9. N-sec-butyl-2,6-dinitro-3-methoxy-4-trifluoromethylaniline.

10. N,N-di-n-propyl-2,6-dinitro-3-methoxy-4-trifluoromethylaniline.

11. N-(3-pentyl)-2,6-dinitro-3-methoxy-4-trifluoromethylaniline.

* * * * *